March 8, 1927.
J. S. MAKIN
AUTOMATIC HUMIDIFIER
Filed Dec. 11, 1926
1,620,373
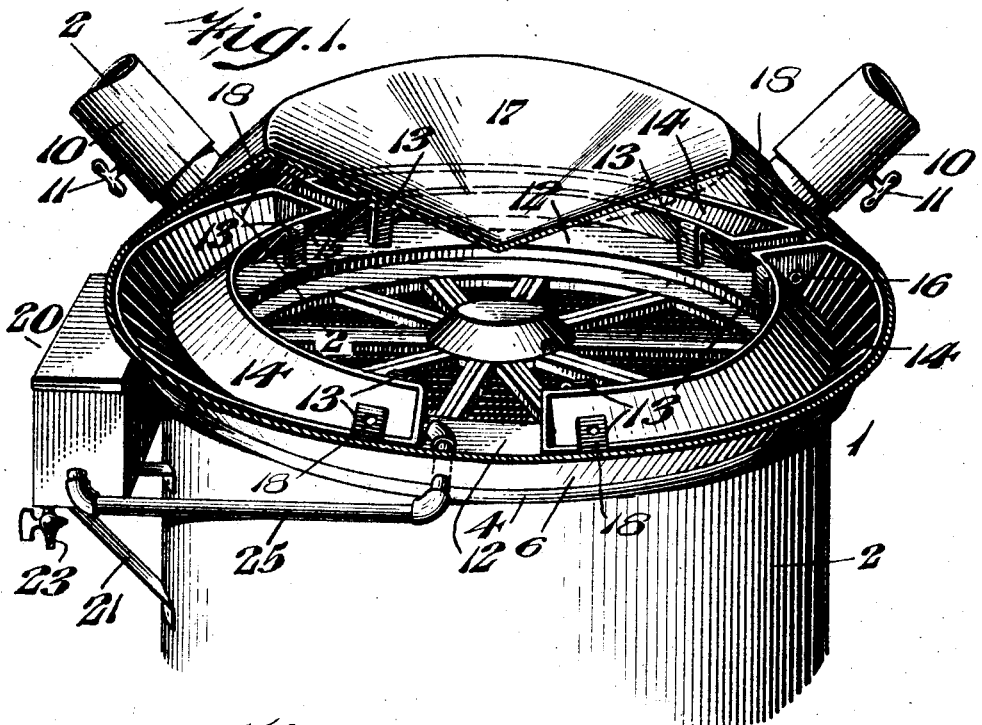
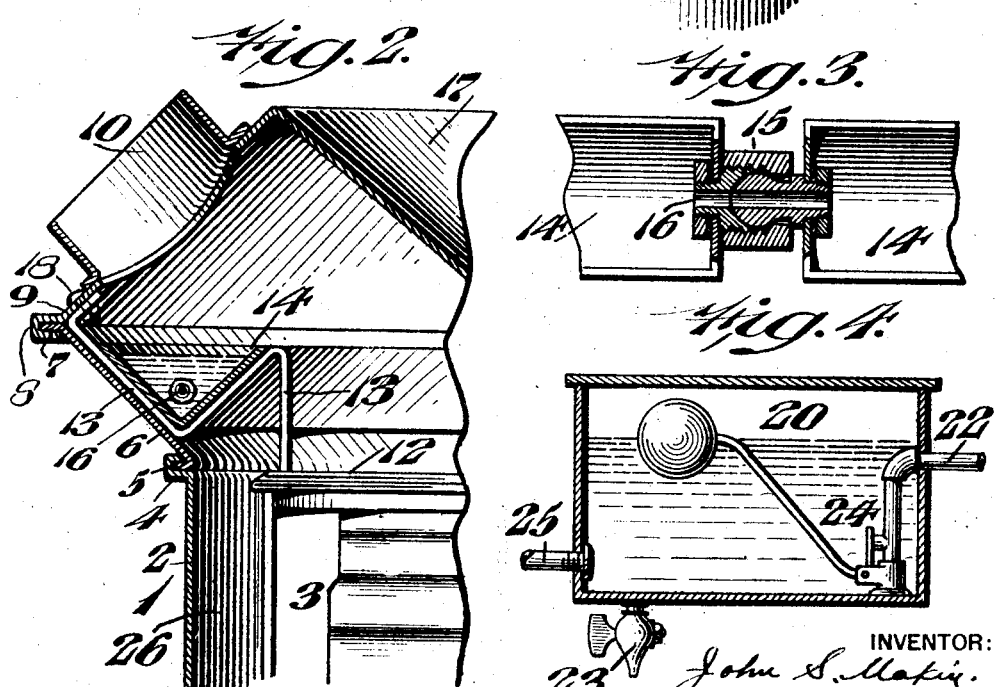
INVENTOR:
John S. Makin.
BY
ATTORNEYS.

Patented Mar. 8, 1927.

1,620,373

UNITED STATES PATENT OFFICE.

JOHN S. MAKIN, OF PHILADELPHIA, PENNSYLVANIA.

AUTOMATIC HUMIDIFIER.

Application filed December 11, 1926. Serial No. 154,090.

My invention relates to a new and useful automatic humidifier adapted for use in connection with warm air heating apparatus and the like and it consists more particularly in a novel humidifier, which will impart sufficent moisture to the warm air before the same is circulated and one which will produce a more uniformly heated air supply.

My invention further relates to a novel humidifier of this general character adapted to prevent the occurrence of what is known as back draft and to increase the effective heating capacity of the heated air without a corresponding increase in the temperature thereof or in the consumption of fuel.

It is well known that atmospheric air normally contains a relative percentage of humidity, varying with the temperature thereof, such moisture being very essential to the well being of all animal and plant life. It is also well recognized that when cold air is heated, it expands and its capacity for absorbing and retaining water vapor increases proportionally thus rendering the heretofore humid air relatively dry. Under natural atmospheric conditions, the humidity of such heated air is at once adjusted by the absorption of moisture from any available source of moisture such as water surfaces, plants and the like, thus maintaining at all times, a varying, but relatively constant state of humidity. On the other hand, when the temperature of air is reduced, its capacity for absorbing and carrying water vapor is decreased, thereby inducing a state of "supersaturation" with the result that the excess moisture condenses into water, again leaving the air with an amount of humidity proportional to its temperature.

Furthermore, owing to the fact that water vapor is a bad conductor of heat, it is obvious that a room heated with relatively humid or moist air feels warmer than one heated with dry air of the same, or even higher temperature and experiment has shown that a room will feel warmer and more comfortable at 70 degrees F. with a 60 percent humidity, than say, at 80 degrees with only 25 percent humidity. It has also been found that the moderate temperature of 65 degrees F. with a 60 percent humidity is very satisfactory in very cold weather.

It has been the practice heretofore, to provide a source of moisture in the form of a receptacle or trough located at a point in proximity to the base of the fire box or combustion chamber, such receptacle being filled with water manually from time to time. In constructions of this character, the heated air was obviously only partially moistened or humidified since such construction did not provide sufficient contact of the heated air with the water surface, and, furthermore, since the air was still further heated after leaving the water surface, its capacity for absorbing water vapor was increased and its relative humidity was therefore reduced.

In other constructions heretofore known and used, the water receptacle or source of moisture was so located with respect to the heating chamber that the water often reached the boiling point, thereby commingling with the heated air a current of live steam and thus supersaturating the air, with the result that the excess moisture condensed on the walls and windows as the air reached the room to be heated.

It is the object of my invention to obviate these and other disadvantages by providing novel means whereby the air is thoroughly but not excessively moistened, thus preventing any subsequent condensation of water vapor when the air reaches the room to be heated. Other objects of my invention are to obtain more uniformly heated air, to prevent back drafts and to increase the effective heating capacity of the hot air without a corresponding increase in temperature or the amount of fuel consumed.

To the above ends, my invention consists of a novel construction of a humidifier formed of troughs having their juxtaposed closed ends connected by a universal or ball and socket joint, whereby said troughs are permitted automatically to position themselves as they become heated, novel means being provided for automatically controlling the flow of water to said troughs. It further consists of novel means for supporting said troughs in position.

For the purpose of illustrating my invention, I have shown in the accompanying drawings, a form thereof which is at present preferred by me since it will give in practice, satisfactory and reliable results, although it is to be understood that the various instrumentalities of which my invention consists can be variously arranged and organized and that my invention is not limited to the precise arrangement and organization of these instrumentalities as herein shown and described. In the accompanying drawings:—

Figure 1 represents a perspective view, partly in section, of the upper portion of a warm air heating apparatus containing an automatic humidifier embodying my invention.

Figure 2 represents, on an enlarged scale, a vertical section on line 2—2 of Fig. 1.

Figure 3 represents, on an enlarged scale, a plan view of the adjacent ends of two troughs, showing the connecting universal joint in section.

Figure 4 represents a vertical sectional view of a water supply tank equipped with a float controlled valve forming part of my invention.

Referring to the drawings, in which like reference characters indicate like parts, 1 designates the upper portion of a conventional warm air heating apparatus, comprising the outer shell 2 and the combustion chamber 3. The upper edge of the outer shell 2 is bent over upon itself to form the annular seat 4, in which is secured the annular, outwardly deflected lip or flange 5, of the upwardly and outwardly inclined housing 6, terminating in the upper annular flange 7, which in turn is secured in the annular seat 8 formed at the lower extremity of the upwardly and inwardly inclined housing 9. To the body portion of said housing 9 are suitably secured the exit flues 10, equipped with the dampers 11 of any conventional construction, through which the heated air is distributed. An inverted cone deflector 17 is suitably secured to the housing 9 in any conventional manner, said deflector also serving as a cover for the apparatus, as will be understood from Figs. 1 and 2.

Resting on the top 12 of the combustion chamber 3, and rigidly secured at their upper ends to the housing 9, by the bolts 18, are the brackets 13 which support the curved V shaped troughs 14, the same being constantly filled with water in a manner to be hereinafter described. The several V shaped troughs are interconnected by the universal or ball and socket joint 15, the same being provided with the hole 16, through which the water may flow from one trough to another, thereby maintaining the same level of water in all the troughs, at all times. The universal joints 15 connecting the troughs 14, are adapted to take up any movement between, and to permit of any adjustment of said troughs, as may be necessary.

A water supply tank 20 is suitably secured to the upper portion 1 of the apparatus, by means of the supporting brackets 21 or the like and is provided with the upper inlet pipe 22, (see Fig. 4), connected to a water main (not shown) and the bottom drain cock 23, through which said tank 20 may be drained whenever necessary for the purpose of cleansing and repair. Within the tank 20 is disposed any conventional float controlled valve 24, adapted to maintain the water in said tank, and in the several V shaped troughs, at any desired level. The exit pipe 25 extends from the water supply tank 20 to the V shaped troughs 14 to supply the same with water, as will be understood from Fig. 1.

Thus the V shaped troughs 14 are constantly supplied with water from the tank 20, in an automatic manner, said tank 20 being in turn supplied from a water main through the inlet pipe 22 and in which the desired level is maintained by means of a float controlled valve 24.

The heated air rises through the annular passage 26 and is deflected by the inverted cone deflector 17 onto the water surface in the V shaped troughs 14, thus insuring a thorough humidification thereof, after which the properly humidified air passes out through the flues 10 to the places to be heated. The inverted cone deflector also serves to commingle the air currents thus insuring a more uniform and even temperature, and prevents back drafts.

It will be apparent that my novel construction of humidifier is adapted to be readily applied to types of hot air furnaces other than the one shown, and while I have shown the preferred manner of supporting and assembling the several troughs, it will be apparent that other means for assembling and supporting the same may be employed if desired.

It will be apparent that as the hot air currents pass upwardly they impinge on the inner inwardly inclined walls of the troughs 14, which are so positioned as to prevent any back drafts from the exit flues 10, and any air or back draft flowing in a reverse direction swirls around the top of the troughs 14, and at the time it meets the incoming heated air, it is flowing in the same direction, thereby tending to increase the velocity of the heated air rather than to retard the same.

The air passages between the troughs 14 and the inverted conical deflector are so proportioned that there will be no retardation of the moistened hot air as it leaves the furnace through the exit flues 10.

Having thus described my invention, what I claim as new and desire to secure by Letters Patent is:—

1. In a device of the character stated, a hot air furnace, a plurality of troughs located in the upper portion thereof, open at their top and closed at their ends, and flexible communicating joints having water passages therethrough connected to the juxtaposed ends of said troughs.

2. In a device of the character stated, a plurality of troughs located in the path of hot air currents and open at their tops and closed at their ends, supporting devices for said troughs, and ball and socket joints having water passages therethrough connected to the juxtaposed end walls of said troughs.

3. In a device of the character stated, a hot air furnace, a plurality of troughs located in the upper portion thereof, the inner, inclined walls of said troughs overhanging the path of hot air currents, an inverted conical cover supported above said troughs, the latter being closed at their ends and open at their tops and ball and socket connections having water passages therethrough connected to the juxtaposed ends of said troughs.

4. In a device of the character stated, a plurality of troughs supported in the path of hot air currents, a feed tank therefor having a float controlled valve therein, a supply pipe leading from the valve in said tank to one of said trough sections, and ball and socket connections having a passage therethrough connected to the juxtaposed end walls of said troughs.

5. In a device of the character stated, a top consisting of an outwardly flaring outer portion and inwardly inclined upper portion, hot-air conduits therefor, an inverted conical deflector supported upon said upper portion, curved upwardly and inwardly inclined trough shaped deflectors having their inner walls projecting at the upper end of and overhanging the air-passages and projecting beneath the inlets of the hot-air exit flues to intercept reverse air-currents in the same, and ball and socket connections having a passage therethrough and connected to the juxtaposed walls of the trough shaped deflectors.

6. In a furnace, a casing having an upper outwardly projecting flange, an annular top resting upon said flange and having an outwardly flaring lower portion and inwardly inclined upper portion, hot-air exit flues extending from said upper portion, and inverted conical deflector supported upon the inwardly, inclined upper portion of the top, curved upwardly and inwardly inclined trough shaped deflectors supported from the top of the upper end of the air-passage and projecting beneath the inlets of said hot-air exit flues to intercept reverse air-currents in the same, and ball and socket connections having a passage therethrough connected to the juxtaposed end walls of said deflectors.

JOHN S. MAKIN.